(12) United States Patent
Connell et al.

(10) Patent No.: US 11,415,722 B2
(45) Date of Patent: Aug. 16, 2022

(54) GAMMA RAY TOMOGRAPHIC RADIOGRAPHY

(71) Applicant: UNIVERSITY OF JOHANNESBURG, Auckland Park (ZA)

(72) Inventors: Simon Henry Connell, Johannesburg (ZA); Martin Nkululeko Hogan Cook, Johannesburg (ZA)

(73) Assignee: UNIVERSITY OF JOHANNESBURG, Johannesburg (ZA)

( * ) Notice: Subject to any disclaimer, the term of this patent is extended or adjusted under 35 U.S.C. 154(b) by 63 days.

(21) Appl. No.: 16/757,169

(22) PCT Filed: Oct. 19, 2018

(86) PCT No.: PCT/IB2018/058162
§ 371 (c)(1),
(2) Date: Apr. 17, 2020

(87) PCT Pub. No.: WO2019/077580
PCT Pub. Date: Apr. 25, 2019

(65) Prior Publication Data
US 2020/0241164 A1 Jul. 30, 2020

(30) Foreign Application Priority Data
Oct. 19, 2017 (ZA) .................. 2017/07077

(51) Int. Cl.
*G01V 5/00* (2006.01)
*G01V 5/12* (2006.01)
(52) U.S. Cl.
CPC ............ *G01V 5/005* (2013.01); *G01V 5/0041* (2013.01); *G01V 5/12* (2013.01)

(58) Field of Classification Search
CPC ......... G01V 5/005; G01V 5/0041; G01V 5/12
See application file for complete search history.

(56) References Cited

U.S. PATENT DOCUMENTS

| 8,541,756 B1 | 9/2013 | Treas |
| 2007/0009081 A1 | 1/2007 | Zhou et al. |
| 2014/0294147 A1 | 10/2014 | Chen et al. |

FOREIGN PATENT DOCUMENTS

| AU | 2015202281 A1 | 5/2015 | |
| CA | 2559516 A1 * | 9/2005 | ........... G01N 23/221 |

(Continued)

OTHER PUBLICATIONS

International Search Report and Written Opinion for International Application No. PCT/IB2018/058162, dated Feb. 1, 2019.

*Primary Examiner* — David P Porta
*Assistant Examiner* — Fani Polyzos Boosalis
(74) *Attorney, Agent, or Firm* — Rimon, P.C.

(57) ABSTRACT

A method of creating a representation of the internal structure of a target object is provided. There is provided a method of creating a representation of the internal structure of a target object having the steps of accelerating a number of charged subatomic particles, guiding the particles to a plurality of emission sources on one side of a target object, emitting electromagnetic radiation from each specific emission source for a discrete period such that, during the discrete period, the specific emission source is associated with the discrete period, the electromagnetic radiation being generated by the conversion of the particles to electromagnetic radiation, detecting, on a side opposing the emission sources, a projection of penetration of the electromagnetic radiation from each emission source, and combining the projections from each source to create a representation of the internal structure of the target object.

13 Claims, 3 Drawing Sheets

(56) References Cited

FOREIGN PATENT DOCUMENTS

WO     20050088283 A1    9/2005
WO     2013082005 A1    6/2013

\* cited by examiner

GAMMA RAY TOMOGRAPHIC RADIOGRAPHY

CROSS-REFERENCE TO RELATED APPLICATIONS

The present application is a National Stage application of and claims priority to PCT application PCT/IB2018/058162 filed Oct. 19, 2018 and titled Gamma Ray Tomographic Radiography, which claims priority benefit to South Africa Patent Application No. 2017/07077, filed on Oct. 19, 2017, the contents of the above applications are incorporated by reference herein in their entireties for all purposes.

FIELD OF THE INVENTION

This invention relates to a method of creating a representation of the internal structure of a target object and more specifically, but not exclusively, to a method of creating a representation of the internal structure of a target object by multi source gamma ray tomographic radiography for detecting diamonds in mining operations.

BACKGROUND TO THE INVENTION

Tomographic radiography refers to a technique used to calculate the internal structure of an object in higher dimensions based on information from multiple data sets of lower dimensionality. Gamma rays, in the broad sense of the word, refers to photons with energy typically greater than 200 keV.

OBJECT OF THE INVENTION

It is accordingly an object of the invention to provide an apparatus for preparing and applying a foliar spray which, at least partially, alleviates some of the problems associated with the prior art.

SUMMARY OF THE INVENTION

In accordance with the invention there is provided a method of creating a representation of the internal structure of a target object comprising the steps of:
- accelerating a number of charged subatomic particles;
- guiding the particles to a plurality of emission sources on one side of a target object;
- emitting electromagnetic radiation from each specific emission source for a discrete period such that, during the discrete period, the specific emission source is associated with the discrete period;
- the electromagnetic radiation being generated by the conversion of the particles to electromagnetic radiation;
- detecting, on a side opposing the emission sources, a projection of penetration of the electromagnetic radiation from each emission source; and
- combining the projections from each source to create a representation of the internal structure of the target object.

The method may include the step of moving the target object from a first position to a second position and repeating the emission and detection steps of the method to combine the projections of the first and second positions to create a more accurate representation of the internal structure of the object. This step may be repeated such that the projections from a plurality of different positions may be combined in order to construct the representation of the internal structure of the target object.

The step of moving the object may be achieved by moving the target object on a conveyor belt. The method may also be performed during the continuous motion of the target object consistent with its normal passage, so that its normal motion is not interrupted. Such motion of the target object is not itself done with the purpose to enhance the tomography. Instead it is recorded in a way that this motion can be fully compensated for. This allows the target object to carry out its normal motion within the continuous process it is involved in.

The internal structure may be represented in three-dimensional space as voxels including gamma ray attenuation information associated with the voxels. The information so represented is a quantification of a parameter or set of parameters, which may be gamma ray attenuation, related to gamma ray attenuation, or also segmented in terms of the material composition of the target object, or any other quantity or parameter that can be derived from the set of recorded observations.

The subatomic particles may be electrons and the electrons may be accelerated with a linear accelerator (linac) or any other accelerator capable of accelerating the electrons to at least 200 keV energy (gamma rays).

The accelerator may output bursts of accelerated particles at regular intervals and the bursts may be arranged in groups or packets of a fixed amount of bursts. Packets are emitted at regular intervals and different packets may be guided to different emission sources. Each discrete period may be associated with a packet.

The energy of the burst may be varied according to a pattern. The pattern may be a regular and incremental increase or decrease of energy of the burst. The difference in energy may be selected such that the chosen energies provide projection images that afford maximum contrast between the different material components of the target material.

The emission source converts the accelerated particles to photons. The photons may be gamma rays with energy exceeding 200 keV. The electrons may be converted to gamma rays by interaction of the beam of high energy electrons with matter through bremsstrahlung off an appropriate material such as tungsten. The radiation may be generated by coherent bremsstrahlung or inverse Compton scattering.

The electrons and radiation are fanned out to create a conical gamma ray beam emitted from each source.

The electron beams may be split and guided to the emission source by beam optical elements such as kicker, septum, bending magnets, and associated focussing magnets.

The target object may be diamond containing kimberlite on a moving conveyor. The energy may be varied to provide maximum differentiation or contrast between kimberlite and diamond.

The target may also be containers of goods to be imported, which must be inspected for presence of prescribed materials or artefacts.

BRIEF DESCRIPTION OF THE DRAWINGS

An embodiment of the invention is described below, by way of example only, and with reference to the drawings in which.

DETAILED DESCRIPTION OF THE DRAWINGS

Figure 1:
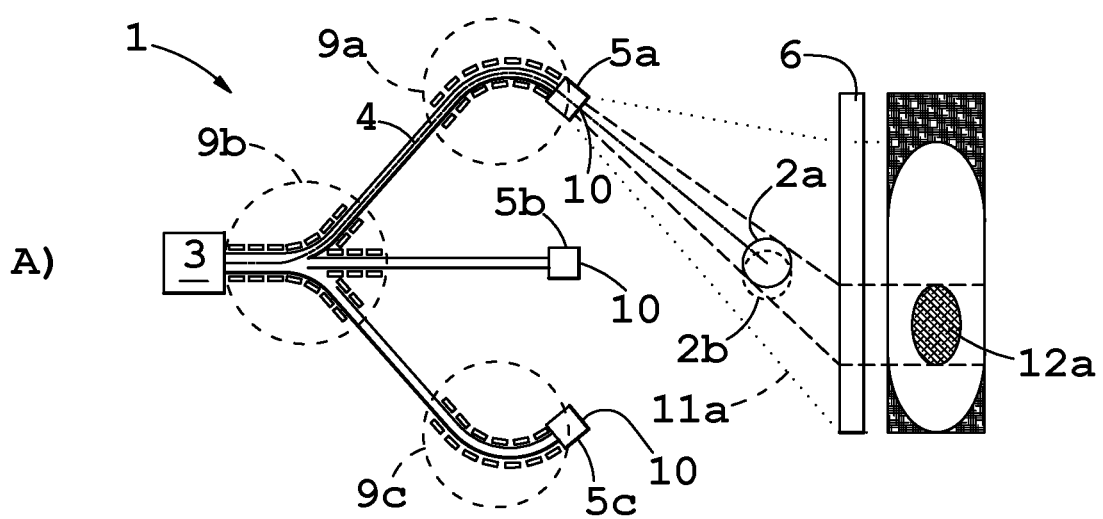
FIG. 1 is a schematic representation of a system for tomographic radiography.
Figure 1:
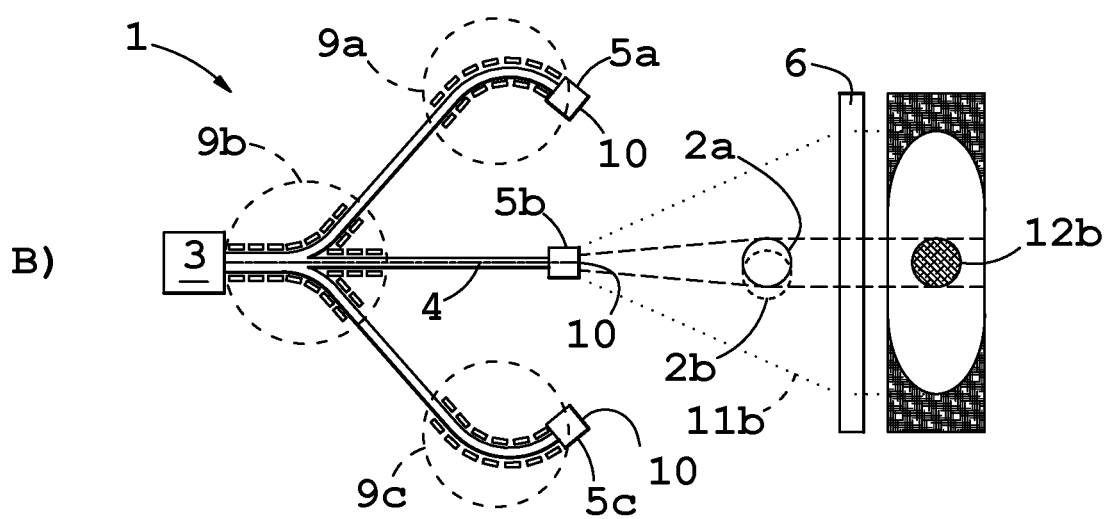
Figure 1:
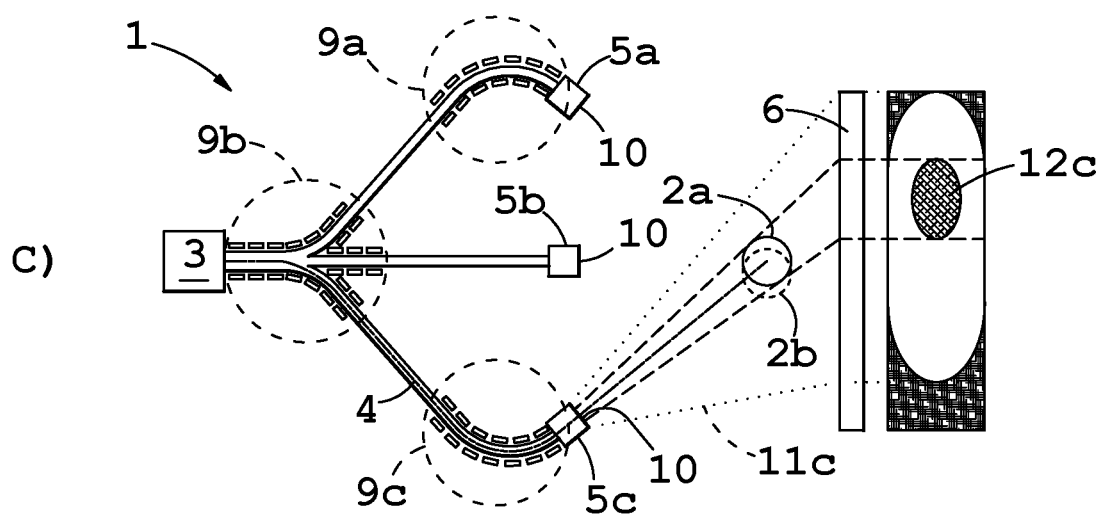

With reference to the drawings in which like features are indicated by like numerals, a system for tomographic radiography is generally indicated by reference numeral 1.

The system 1 is configured to execute a method of creating a representation of the internal structure of a target object 2 according to the invention. The method includes the step of accelerating a number of charged subatomic particles. The subatomic particles may be electrons and the electrons may be accelerated with a linear accelerator (linac) 3.

The electrons 4, or electron bundles as described hereunder, are guided to a plurality of emission sources 5 on one side of a target object 2. This is achieved by using beam optical elements. These can be deflection magnets (kickers) where deflected beam is collected by septum magnets if necessary and the further guided by bending magnets. Other beam optical elements for focussing or defocussing are used as required. The bending magnets 9, shown in FIG. 1 as three clusters (9a, 9b, and 9c) of magnets, are very accurately controlled over time. The magnets are used to branch the electrons 4, as is the case with cluster 9b, or guide the electrons 4 in a particular direction, as is the case with clusters 9a and 9c.

Figure 2:
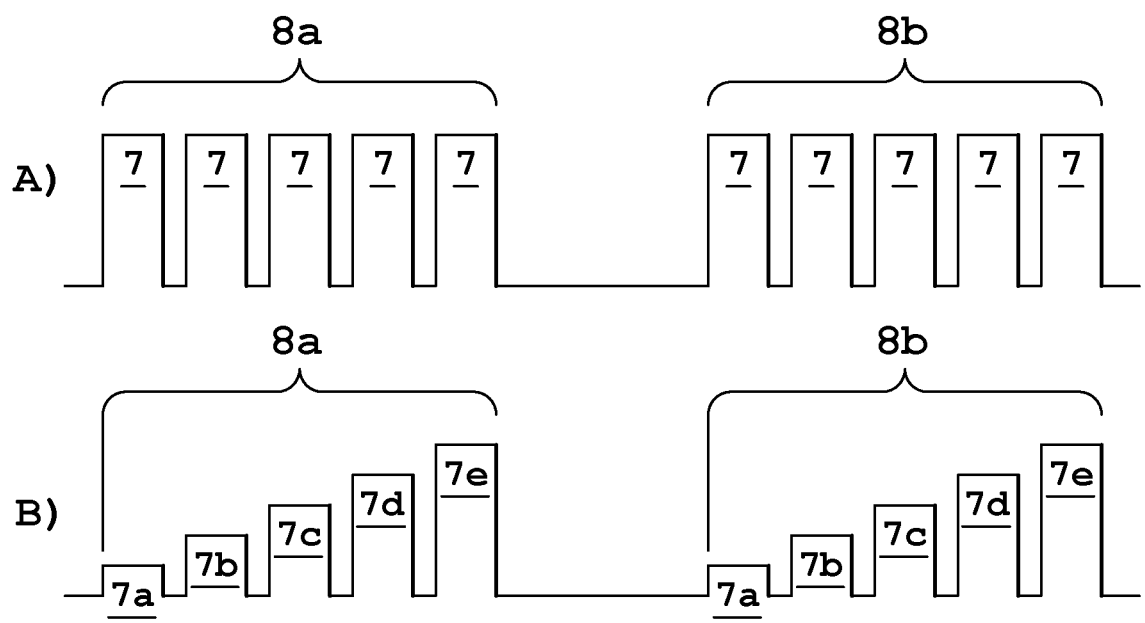
FIG. 2 is a is a schematic representation of the energy output of a particle accelerator.

The electrons 4 are expelled from the accelerator 3 in bursts 7 of accelerated electrons 4 at regular intervals and the bursts may be arranged in groups or packets 8 of a fixed number of bursts. In FIG. 2, graph A shows the output of the accelerator 3 over time. The length of time which the accelerator is active per burst 7 may be as little as 1 nanosecond. The packets 8 are emitted at regular intervals and different packets may be guided to different emission sources 5. This way, each discrete period, or packet 8, can be associated with a specific source. For example, packet 8a, may be guided to emission source 5a and packet 8b may be guided to emission source 5b. A packet succeeding 8b may be guided to emission source 5c and a subsequent packet may again be guided to 5a. This process continues such that it is possible, by keeping proper record of the timing and guidance of each packet 8, to distinguish between the different emission sources 5 based on timing information.

In this example, three emission sources (5a, 5b, and 5c) are arranged linearly with the central source 5b directed at the centre of a detector 6 and flanking sources 5a and 5c directed, at an angle, toward the centre of the detector 6. The detector 6, for the purpose of this example, is rectangular and can detect electromagnetic radiation in two dimensions. Each source 5 emits electromagnetic radiation a discrete period such that during the discrete period, the specific emission source is associated with the discrete period. The electromagnetic radiation is generated by conversion of the electrons 4 to gamma rays. This may be achieved by directing the electron beam incident on a tungsten bremsstrahlung target 10 to create the gamma rays. The electromagnetic radiation is generated by the interaction of the beam of high energy radiation with matter or with light. The electrons 4, and consequently the resultant gamma ray beam 11, are fanned out to create an expanding beam of roughly conical shape. The electron beam is scanned over a fanned out area, and as such it passes through the bremsstrahlung converter material (tungsten). The resulting photons are substantially co-linear with the primary electron beam, but there is some additional divergence introduced by the bremsstrahlung. The beam 11 is directed at the target object 2 and detector 6 and is alternated between the different emission sources (5a, 5b, and 5c).

The detector 6 is capable of registering the energy, time and position for each photon that impacts it with high efficiency, and with multi-hit capacity and in a way that has little latency and provides a high degree of parallel processing capacity for optical, electronic and digital information arising from different spatial points. This can be done at very high data acquisition rates. The detector 6 is adapted to the energy that must be detected and is likely to include continuous or discrete segmented scintillator material where the scintillation light is converted to an electronic pulse for downstream processing. Direct conversion of energy from gamma rays to an electric signal is also possible.

The method includes the step of detecting, on a side opposing the emission sources 5, a projection 12 of the relative penetration probability (transmission probability) of the electromagnetic radiation from each emission source 5. In this example, the projection 12a corresponds to emission source 5a, projection 12b to source 5b, and projection 12c to source 5c. The projection 1, as exemplified herein is spatial transverse projection of the radiation 11 and has a two-dimensional map with the penetration indicated in terms of the colour of the resultant penetration. A lighter colour (white or grey) will correspond with a low gamma ray attenuation and a darker colour (dark grey or black) will correspond to a higher gamma ray attenuation. The transmission probability can be recorded as a function also of the energy of the photon, so that one has separate transmission projections in bins of photon energy.

The final step of the method includes combining the projections 12 from each source 5 to create a representation of the internal structure of the target object 2. As can be seen from FIG. 1, the projections 12 (or shadows) have different patterns representing the penetration of the gamma rays emitted from the different sources. In an example where the target object is a solid sphere for illustration purposes, the outer projections (12a and 12c) will have substantially elongated elliptical shapes with the central projection having a roughly round shape. Each of the projections (12a, 12b, and 12c) will have a penetration map which shows the highest gamma ray attenuation (darker) at the center of the project which gradually shows lesser attenuation (lighter) towards the perimeter of the projection 12 and with a sharp drop to very low attenuation (very light or white) beyond the perimeter.

A variation of the embodiment described above (not shown) wherein the use of bending magnets is minimized (for budgetary or other reasons) requires the emission sources to be closer to the bending magnet splitter 9b. This negates the need for bending magnet clusters 9a and 9c. In this variation, three detectors 6 are arranged to correspond to the direction of the emission sources and the different angles of the target object 2 are recorded as the object moves between the first, second, and third emission sources 5 and associated detectors 6. With the movement of the target object known, the resultant time difference between capturing the projections 12 between each emission source and detector may be calculated and used to combine the projections.

The combination of transverse radiographic projections into a single three-dimensional representation is a tomographic process. The invention uses multiple sources 5 and multiple detectors 6 referenced to a high rate multiplexing so that the data acquisition rate is highly enhanced enabling the continuous rather than batch mode processing. The energy dispersive detection of single photons is also considered. As the energy of the transmitted beam can be varied as a distribution by varying the accelerated electron beam energy, the collection of a set of energy differential transverse radiographic projections (projections with energy tags) could also exploit the variable energy capacity of the gamma ray source.

Many algorithms may be employed to create the representation of the internal structure. As the projections 12 are two dimensional, the resultant internal structure may be represented in three-dimensional space as voxels with gamma ray attenuation information associated with the voxels. An example of such an algorithm is referred to as the iterative maximum likelihood algorithm. The algorithm assumes an estimated gamma ray attenuation distribution of the internal structure of the target object 2. The estimated distribution is guessed and does not need to be accurate. A calculation is performed to determine a projection pattern on the detector 6 the estimated object distribution would have created for each of the sources 5 used. This is referred to as forward projection. The differences between the estimated pattern and the measured values are then used to update the estimated distribution. This is referred to as back projection. The updated estimated distribution is then used as the guess for the next iteration, and so on. As the process iterates, the estimated distribution converges towards the actual object distribution, up to the limits of the information available (resolution, available angles, etc.). Systematic effects of photon attenuation and scattering, detector 6 or beam 11 related system effects like non-uniform photon distributions, and non-uniform detection efficiencies can be compensated for or partially removed in both deterministic and stochastic ways.

The method may include the step of moving the target object 2 from a first position 2a to a second position 2b and repeating the emission and detection steps of the method to combine the projections of the first and second positions to create a more accurate representation of the internal structure of the object 2. This step may be repeated such that the projections from a plurality of different positions may be combined in order to construct the representation of the internal structure of the target object without the degradation caused by the movement. The step of moving the object may be achieved by moving the target object on a conveyor belt, or it may be a train carrying a container on a rail or any other such system. It is generally the normal motion of the object that is accommodated in the process, so that continuous processes can be accommodated. The additional captured projections and associated positions may be used in conjunction with the algorithm described above to construct a three-dimensional gamma ray attenuation distribution of the internal structure.

The energy of the bursts may be varied according to a pattern. The extraction of an extra dimension of energy information for the detected transmitted photons exploits the single photon energy dispersive detection capacity of the detectors 6. The pattern may be regular and include incremental increases or decreases in the energy of the burst. The pattern may be varied according to a mathematical function or the difference in energy may be selected such that the chosen energies provide maximum contrast between available composition of the target object. The process can be made more precise by the use of multiple energies of photons. The energy discrimination could be provided either by a method that can bin the energy of photon based on its production, or by a method that filters the photons, or by a method based on its detection. For example, by utilising a linac (or any other accelerating source) capable of ramping up its energy on a short time scale, it is then possible to obtain multiple energy information on a sample using gamma rays. This is done in order to label a photon energy dimension in addition to the set of transverse radiographic projections are considered. This provides a way to attain some degree of atomic number discrimination within the object scanned.

In the current example, information relating to the energy information of the beam 11 for a particular time interval 8 and spectroscopic information from the detector 6 is captured. The varied energy technique could be combined with the tomographic data to yield more information about the target object 2. Instead of performing tomography on the total number of detected events at a particular detector element, we would include an additional tag in the data at each detector pixel which is a combination of the signals received appropriate for extracting the different energies. There will be sets of transverse radiographic projections in bins of photon energies. The segmentation of the three-dimensional quantitative image (for photon attenuation) may be supplemented by an additional dimension of information which is the energy dependence of the attenuation. This endows additional capacity for material identification, based on the energy dependence of each materials gamma ray attenuation coefficient and enhances the sensitivity to the material composition, enabling a more detailed segmentation.

Figure 3:
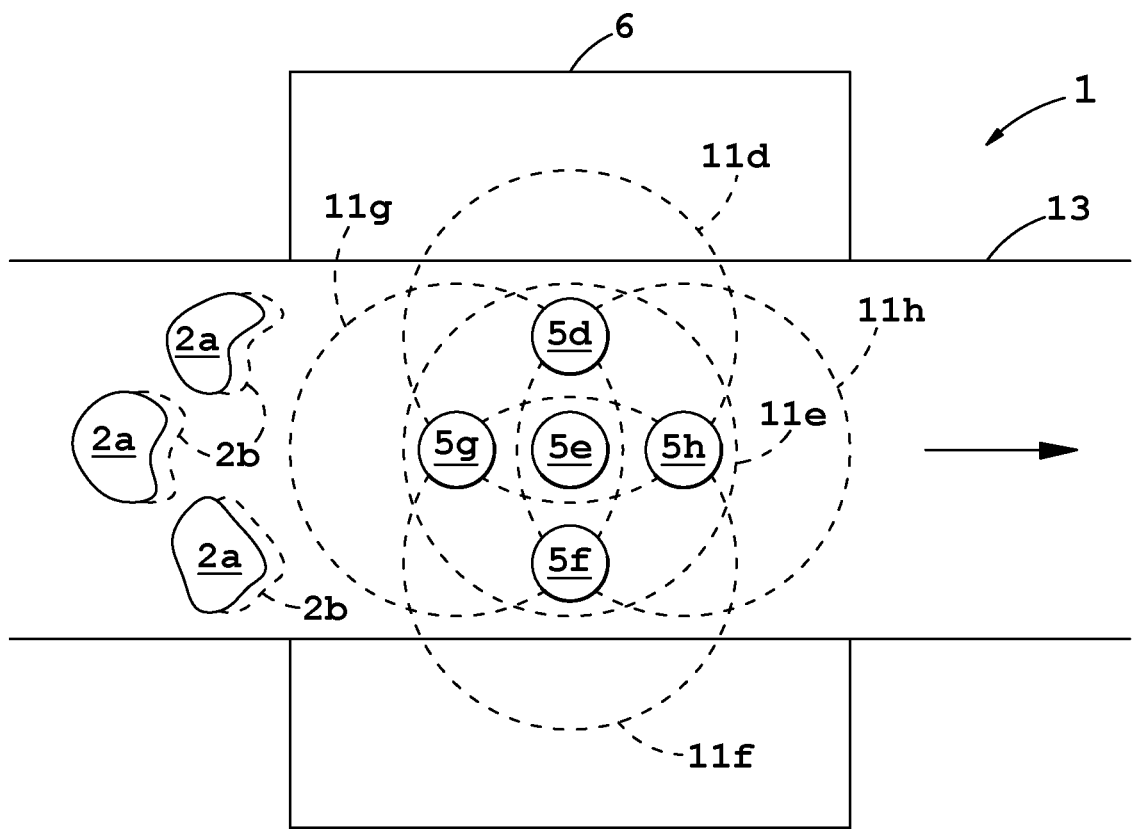
FIG. 3 is a schematic representation of a system for tomographic radiography with five emission sources and a conveyor belt running beneath the sources.

In an example of the method in use, a system 1 for executing the method may be configured as shown in FIG. 3. The system shown in FIG. 3 is specifically adapted for use in a diamond mine, where the target objects 2 are crushed rocks from the mining process. The system 1 has five emission sources (5d to 5h) arranged with a central source 5e, surrounded by four emission sources (5d, 5f, 5g, and 5h) spaced at equal distances and angles about the central source 5e. Each emission source emits a gamma ray beam (11d to 11h) towards the target objects 2 which are moving on a conveyor belt 13 operatively below the emission sources. A detector 6 is positioned below the conveyor belt 13. The tomographic reconstruction may thus be performed on projections obtained from five angles from the five emission sources, as well as continuous movement of the conveyor belt 13.

The energies in the example system are varied to provide maximum contrast between kimberlite and carbon. This provides maximum discrimination between carbon, with atomic number (Z=6) and kimberlite, which is composed of higher Z elements. The values may be combined tomographically to create a three-dimensional map of the carbon discriminating function, allowing the detection of diamond within kimberlite. The target objects which have a larger probability of enclosed diamonds may, based on this information, be filtered or directed to a separate conveyor.

Figure 4:
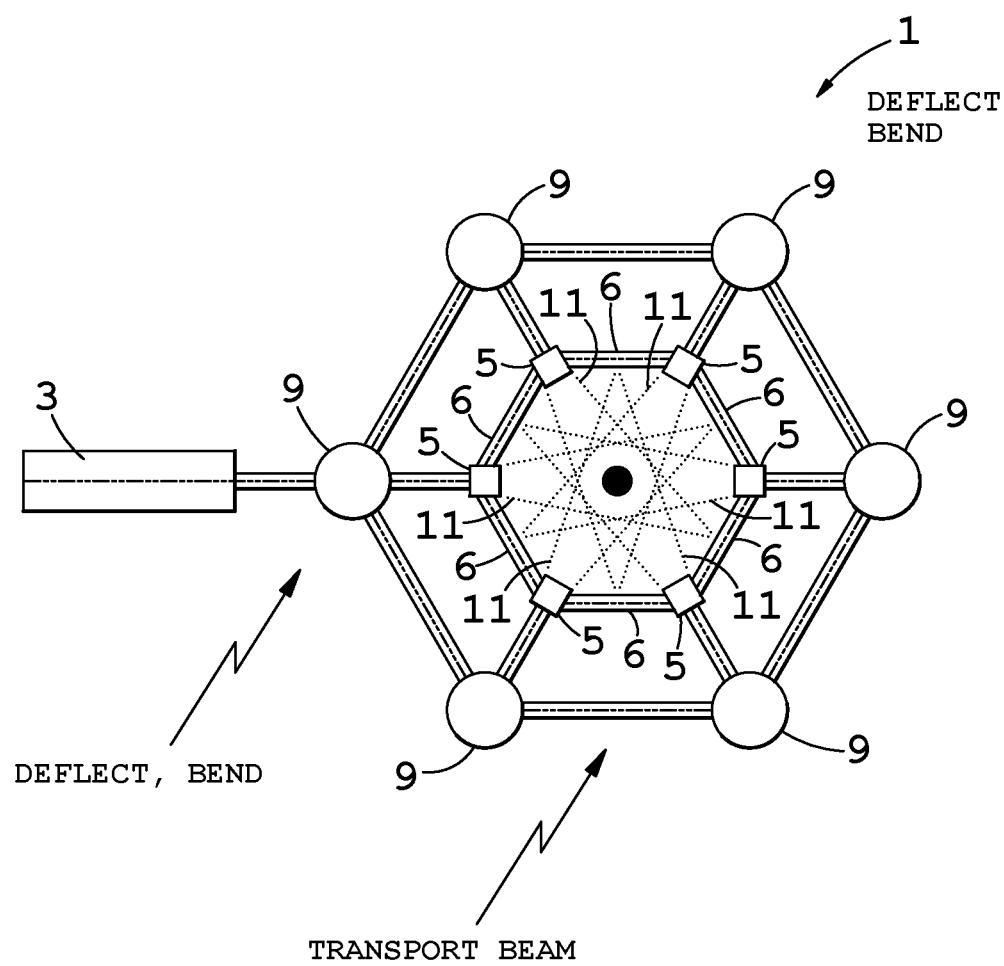
FIG. 4 is a schematic representation of a system for tomographic radiography with six emission sources and six detectors arranged hexagonally.
Figure 4:
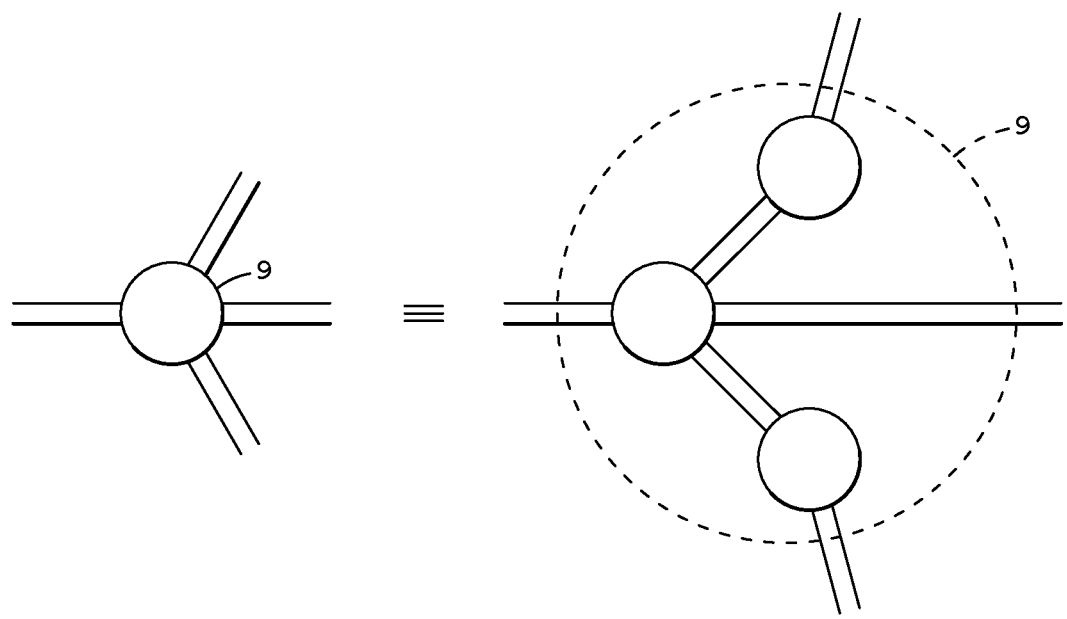

In yet another embodiment of the invention shown in FIG. 4, the system 1 for executing the method includes a linac 3, six beam splitting and bending magnet bundles 9 arranged hexagonally with six emission sources 5 corresponding with the bundles 9. Six detectors 6 are positioned opposing the emission sources with a target object between the source and detectors 6. The system may include more or less emission sources, arranged geometrically according to the number of chosen emission sources and detectors for example having five sources 5 and detectors 6 arranged is the shape of a pentagon.

It is envisaged that the invention will provide a method of reconstructing the internal structure of unknown objects, specifically enclosed diamonds, which provides three-dimensional information and is capable of high energies and penetration.

The disadvantages which are alleviated include the ability to create representations in a continuous rather than batch process. The use of more penetrating radiation (gamma rays) allows larger target objects to be processed. Parallel use of multiple detectors and sources (which are disambiguated in the representation formation process using timing correlation information) enables very high rate data acquisition. The invention uses single-photon detection of the radiation rather than a saturation or non-energy dispersive process enabling an extra component of transmitted photon energy to be used. The invention allows all these aspects to be combined simultaneously. Gamma rays are produced by methods capable of reaching higher energies than X-rays, and in these are usually accelerator-based sources. This invention considers several types of such sources where the energy of the accelerated beam can also be varied as part of the strategy in fast quantitative three-dimensional representation creation.

The invention is not limited to the precise details as described herein. For example, instead of using the method to detect diamonds, a system may be configured to detect the internal structure of shipping containers or vehicles at border crossings. Further, the energies need not be selected for maximum contrast between diamond and kimberlite and could target several groups of atomic numbers and material types.

The invention claimed is:

1. A method of creating a representation of the internal structure of a target object comprising the steps of:
   accelerating a number of charged subatomic particles in bursts of charged subatomic particles at regular intervals such that the bursts are arranged in groups where each group has a fixed amount of bursts, wherein the charged subatomic particles are electrons and said electron are accelerated to at least 200 keV energy;
   guiding the particles to a plurality of emission sources on one side of a target object such that each group is guided to an emission source;
   emitting electromagnetic radiation from each emission source for a discrete period such that, during the discrete period, the specific emission source and group is associated with the discrete period;
   the electromagnetic radiation being generated by the conversion of the particles to photons with energies exceeding 200 keV;
   detecting, on a side opposing the emission sources, energy, time, and position for each detected photon and using the energy, time, and position of each detected photon to create a plurality of projections of penetration of photons from each emission source; and
   combining the projections from each source to create a representation of the internal structure of the target object.

2. The method of claim 1 wherein the energy of each burst is varied.

3. The method of claim 2 wherein the energy of bursts are varied according to a pattern.

4. The method of claim 3 wherein the pattern is a regular and incremental increase of the energy of the burst.

5. The method of claim 3 wherein the pattern is a regular and incremental decrease of energy of the burst.

6. The method of claim 2 wherein the variation in energy is selected such that the varied energies provide projection images with greater contrast between the different material components of the target object.

7. The method of claim 2 wherein the energy is varied to provide maximum differentiation between kimberlite and diamond.

8. The method of claim 1 wherein the electrons are converted to gamma rays by inverse Compton scattering.

9. The method of claim 1 wherein the electrons are converted to gamma rays by interaction of the electrons with matter through bremsstrahlung off an object.

10. The method of claim 9 wherein the bremsstrahlung is coherent bremsstrahlung.

11. The method of claim 9 wherein the object is made from tungsten.

12. The method of claim 1 wherein the gamma rays are fanned out to create a conical gamma ray beam emitted from each source.

13. The method of claim 1 wherein the target object is diamond containing kimberlite on a moving conveyor.

\* \* \* \* \*